US 8,116,766 B2

(12) United States Patent
Muller

(10) Patent No.: US 8,116,766 B2
(45) Date of Patent: Feb. 14, 2012

(54) METHOD FOR OPTIMIZING SEARCH COMMUNICATION NETWORK BY MOBILE COMMUNICATIONS TERMINAL

(75) Inventor: Pierre-Jean Muller, Charenton le Pont (FR)

(73) Assignee: NEC Corporation, Tokyo (JP)

( * ) Notice: Subject to any disclaimer, the term of this patent is extended or adjusted under 35 U.S.C. 154(b) by 885 days.

(21) Appl. No.: 12/064,328

(22) PCT Filed: Aug. 29, 2006

(86) PCT No.: PCT/JP2006/316947
§ 371 (c)(1),
(2), (4) Date: Feb. 20, 2008

(87) PCT Pub. No.: WO2007/026679
PCT Pub. Date: Mar. 8, 2007

(65) Prior Publication Data
US 2009/0247160 A1     Oct. 1, 2009

(30) Foreign Application Priority Data
Sep. 2, 2005  (FR) ..................................... 05 52664

(51) Int. Cl.
*H04W 4/00* (2009.01)
(52) U.S. Cl. ...................... 455/434; 455/432.1; 455/433
(58) Field of Classification Search ................... 455/434
See application file for complete search history.

(56) References Cited

U.S. PATENT DOCUMENTS

| | | | | |
|---|---|---|---|---|
| 6,934,544 | B2 * | 8/2005 | Cooper et al. | 455/435.2 |
| 7,542,451 | B2 * | 6/2009 | Cooper et al. | 370/335 |
| 2003/0232631 | A1 * | 12/2003 | Ohmori | 455/552.1 |
| 2008/0139226 | A1 * | 6/2008 | Poyhonen et al. | 455/458 |

(Continued)

FOREIGN PATENT DOCUMENTS

JP     2001-103530 A     4/2001

(Continued)

OTHER PUBLICATIONS

Japanese Office Action, issued by the Japanese Patent Office in counterpart Japanese Application No. 2007-533247 on Oct. 5, 2011.

*Primary Examiner* — Nick Corsaro
*Assistant Examiner* — Sowmini Nair
(74) *Attorney, Agent, or Firm* — Sughrue Mion, PLLC

(57) ABSTRACT

The present invention relates to a method for optimizing a search of a Public Land Mobile Network (PLMN) by a mobile terminal having a nonvolatile memory and a Subscriber Identity Module (SIM) card. The method includes: searching for a PLMN based on priority information registered in the SIM; regarding the PLMN that has been found, determining whether the SIM card includes any priority information about at least one particular radio access technology associated with the PLMN; when priority information is included, selecting a cell of the PLMN; when priority information is not included, determining whether the nonvolatile memory includes any information about at least one particular radio access technology to be selected on a priority basis in a country of the PLMN; when priority information is included, selecting a cell of the PLMN for which the particular radio access technology has been developed; and when priority information is not included, selecting a cell where a radio access technology, which is set beforehand by default in the nonvolatile memory for all countries that are not listed in the nonvolatile memory, has been developed.

14 Claims, 1 Drawing Sheet

U.S. PATENT DOCUMENTS

2010/0015973 A1 * 1/2010 Islam et al. .................. 455/434

FOREIGN PATENT DOCUMENTS

| | | |
|---|---|---|
| JP | 2003-143646 A | 5/2003 |
| JP | 2003-517803 A | 5/2003 |
| JP | 2004-23391 A | 1/2004 |
| JP | 2004-304399 A | 10/2004 |
| WO | 01/47316 A2 | 6/2001 |
| WO | WO 01/45446 A1 | 6/2001 |
| WO | WO 0147316 A2 * | 6/2001 |
| WO | WO 03/090013 A2 | 10/2003 |
| WO | WO 2004-060014 A2 | 7/2004 |
| WO | WO 2004060014 A2 * | 7/2004 |
| WO | 2004/105267 A2 | 12/2004 |

* cited by examiner

METHOD FOR OPTIMIZING SEARCH COMMUNICATION NETWORK BY MOBILE COMMUNICATIONS TERMINAL

TECHNICAL FIELD

The present invention is in the field of communications, and more particularly, relates to a method for optimizing a search of a Public Land Mobile Network (PLMN) by a mobile terminal including a nonvolatile memory and a Subscriber Identity Module (SIM) card.

The present invention also relates to a multimode mobile communications terminal including means for executing the present method.

First, it should be noted that each of PLMNs has an identifier including two fields: a first field having a Mobile Country Code (MCC) of a country to which a PLMN belongs; and a second field having a Mobile National Code (MNC) granted to a PLMN of a given communications company in a country in order to discriminate from a PLMN of another communications company in the country.

In a given country, to prevent the same code from being used by two different countries, all PLMNs have the same MCC assigned by the international organization called "International Telecommunication Union (ITU)".

The two fields, that is, the MCC and the MNC constitute an essential part of International Mobile Subscriber Identity (IMSI).

BACKGROUND ART

When a user of a mobile communications terminal moves in a geographical zone covered by different PLMNs, and cannot receive communications over the current network, then the mobile communications terminal has to search for a new network providing a better communications condition.

The technical specification 3GPP TS 31.102 prepared by the group of 3rd Generation Partnership Project (3GPP) proposes a priority configuration of a radio access technology (RAT) in which one or more radio access technologies (RAT) are made associated with one PLMN. According to this, a mobile communications terminal grants a priority to the radio access technology (RAT) that has the highest priority to search for a network present in the environments every time it loses a network coverage. A communications company or a subscriber can set a priority level in the SIM card. A PLMN associated with a radio access technology (RAT) set by the communications company is specified by an Operator PLMN (OPLMN), and a PLMN associated with a radio access technology (RAT) set by the user is specified by a User PLMN (UPLMN). Priority setting is stored in a list saved in the SIM card of the mobile communications terminal.

A drawback of the related art described above arises from the fact that, when the terminal searches for a PLMN that is clearly not listed in the list of the SIM card, a radio access technology (RAT) is randomly selected, and the selection of the radio access technology may not suit a user's need and/or may not suit the characteristics of a communications company with respect to accepting of roaming and/or with respect to financial benefit. When the mobile communications terminal finds a PLMN that is not associated with a RAT having a priority in the SIM card, this above described situation may occur.

An exemplary object of the present invention is to solve the problems of the related art described above.

Another exemplary object of the present invention is to shorten the amount of time that a mobile communications terminal needs to search for a communications network in order to limit consumption of a battery power in the mobile communications terminal.

DISCLOSURE OF THE INVENTION

For this purpose, an exemplary aspect of the present invention proposes a method capable of optimizing a Public Land Mobile Network (PLMN) search made by a mobile communications terminal having a nonvolatile memory and a Subscriber Identity Module (SIM) card in order to take into consideration the preference of a user and/or a communications company for a radio access technology (RAT) that will be used in various countries where the mobile communications terminal may be used.

This method includes:

searching for a PLMN based on priority information registered in the SIM card, regarding the PLMN that has been found, determining whether the SIM card includes any priority information about at least one particular radio access technology associated with the PLMN, when priority information is included, selecting a cell of the PLMN, when priority information is not included, determining whether the nonvolatile memory has any information about at least one particular radio access technology to be selected on a priority basis in a country of the PLMN, when priority information is included, selecting a cell of the PLMN for which the particular radio access technology has been developed, and when priority information is not included, selecting a cell where a radio access technology defined beforehand by default in the nonvolatile memory has been developed.

The method of the present invention involves preparation including registering, in the nonvolatile memory, association made between at least one code indicating a country where the mobile communications terminal may be used, and at least one radio access technology to be searched for on a priority basis in this country.

Preferably, the nonvolatile memory further has information about a radio access technology to be searched for by default in a country that is not listed in the nonvolatile memory.

Associating information, when the nonvolatile memory is designed, can be registered in the nonvolatile memory or remotely downloaded in the nonvolatile memory by a communications company.

According to another feature of the present invention, the associating information can be reconfigured by a communications company and/or a user of the mobile communications terminal.

The method of the present invention is executed in a Global System for Mobile Communications (GSM)/Universal Mobile Telecommunication Systems (UMTS) multimode mobile phone including the nonvolatile memory and the SIM card.

The nonvolatile memory includes a list of association made between at least one code indicating a country where the mobile communications terminal may be used, and at least one radio access technology to be searched for on a priority basis in this country.

The list further has information about a radio access technology to be searched for by default in a country that is not listed in the nonvolatile memory.

Another feature and advantage of the present invention will be obvious from the following description that is provided only as a nonrestrictive exemplary embodiment, with reference to the accompanying drawing illustrating a flowchart of searching for a PLMN according to the present invention.

BEST MODE FOR CARRYING OUT THE INVENTION

Figure 1:
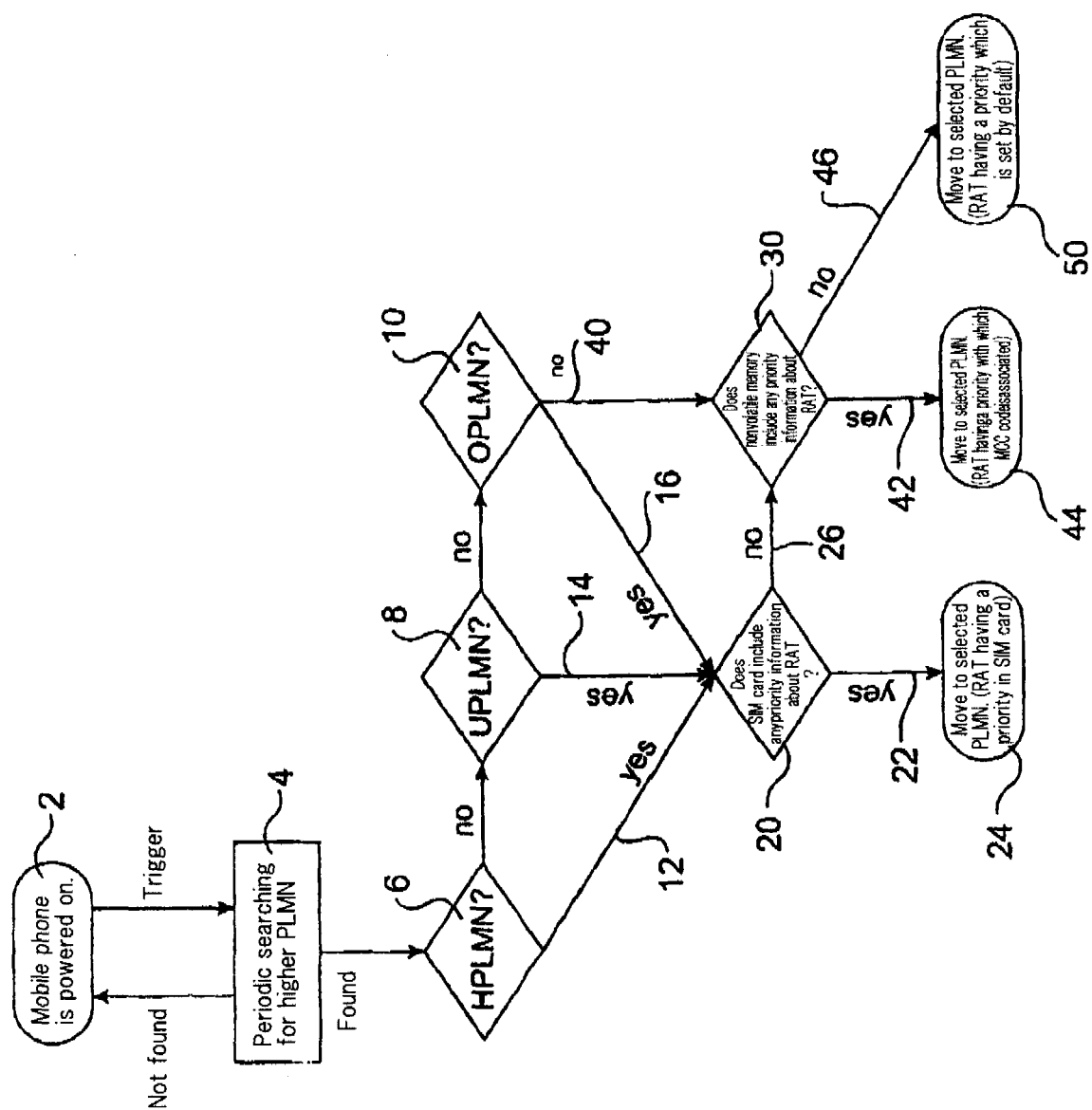
FIG. 1 is a flowchart illustrating a search for a PLMN according to the present invention.

In the following description, for example, the Public Land Mobile Network (PLMN) (Global System for Mobile Communications {GSM} or Universal Mobile Telecommunication Systems {UMTS}) in which a subscriber registers participation therein is called "Home PLMN (H-PLMN)", a PLMN belonging to a network list that should be searched on a priority basis according to a reference selected by a user registered in the SIM card is called "User PLMN (UPLMN), and a PLMN belonging to a network list that should be searched according to a reference selected by a communications company registered in the SIM card and on a priority basis according to a radio access technology (RAT) applied in the PLMN is called "Operator PLMN (OPLMN).

Next, the present invention will be described with reference to an exemplary embodiment of this method executed by a GSM/UMTS multimode mobile phone having a nonvolatile memory including association made between at least one code indicating a country where a mobile communications terminal may be used, and at least one radio access technology (RAT) to be searched for on a priority basis in this country. The association is registered in a list including a MCC code of a country, and one or more radio access technologies (RAT) for which the mobile communications terminal should search on a priority basis in the country.

The accompanying drawing shows searching for a PLMN of a mobile phone, when power is turned on or when network coverage in a roaming zone is lossed.

When the mobile phone is powered on in the zone (step 2), physical layer L1 and Access Stratum (AS) scan a list of frequency allocations of an adjacent cell (Absolute Radio Frequency Number: ARFCN), list BA_List of beacon frequency allocations of an adjacent cell for the GSM systems, and list 3G_Cell_Reselection-list of a carrier of scrambling code of adjacent cell 3G for the UMTS systems (step 4), and creates a list of a PLMN available in the environments.

For the purpose of considering priority information of a user or a communications company, the mobile phone determines at steps 6, 8 and 10 whether or not the SIM card includes any priority information about a HPLMN network, UPLMN network, or OPLMN network.

When the mobile phone finds out such priority information in the SIM card (arrows 12, 14 and 16), it determines whether or not the SIM card further includes any priority information about a radio access technology (RAT) for entering the network that has been found (step 20). When included (arrow 22), the mobile phone selects a cell in which a RAT has priority, and moves to the selected cell (step 24). When not included (arrow 26), the mobile phone determines in step 30 whether or not a MCC code of the selected PLMN is associated with a RAT having priority in the list in the nonvolatile memory. When the mobile phone does not find priority information about any network of the HPLMN, UPLMN and OPLMN in the SIM card (arrow 40), step 30 is then also executed.

When the MCC code of the selected PLMN is associated with a RAT having priority in the list in the nonvolatile memory (arrow 42), the mobile phone selects a cell on a priority basis where the shown RAT having priority has been developed, and moves to the selected cell (arrow 44).

When the MCC code of the selected PLMN is not associated with a RAT having priority in the list in the nonvolatile memory (arrow 46), the mobile phone selects a cell where a radio access technology (RAT), which is set by default for all countries that are not listed in the list, has been developed (step 50).

The invention claimed is:

1. A method for optimizing a search of a Public Land Mobile Network (PLMN) by a mobile communications terminal having at least one nonvolatile memory and at least one Subscriber Identity Module (SIM) card, comprising:
    searching for a PLMN based on priority information registered in the SIM card;
    regarding the PLMN that has been found, determining whether the SIM card includes any priority information about at least one particular radio access technology associated with the PLMN;
    when priority information is included in the SIM card, selecting a cell of the PLMN;
    when priority information is not included in the SIM card, determining whether the nonvolatile memory includes any information about at least one particular radio access technology to be selected on a priority basis in a country of the PLMN;
    when priority information is included in the nonvolatile memory, selecting a cell of the PLMN for which the particular radio access technology has been developed; and
    when priority information is not included in the nonvolatile memory, selecting a cell, where a radio access technology, which has been set by default in the nonvolatile memory for all countries that are not listed in the nonvolatile memory.

2. The method according to claim 1, further comprising:
    preparation including registering, in the nonvolatile memory, association made between at least one code indicating a country where the mobile communications terminal may be used, and at least one radio access technology to be searched for on a priority basis in this country.

3. The method according to claim 2, wherein
    when there is not the association made between a radio access technology and a code indicating a country where the mobile communications terminal is used, the nonvolatile memory further has information about a radio access technology that is searched for by default.

4. The method according to claim 2, wherein
    when the nonvolatile memory is designed, the association is registered in the nonvolatile memory by a communications company.

5. The method according to claim 2, wherein
    the association is remotely downloaded in the nonvolatile memory.

6. The method according to claim 2, wherein
    the association can be reconfigured by a user of the mobile communications terminal.

7. The method according to claim 1, wherein
    the mobile communications terminal is a Global System for Mobile Communications (GSM)/Universal Mobile Telecommunication Systems (UMTS) multimode mobile phone.

8. A mobile communication terminal comprising:
a nonvolatile memory;
a Subscriber Identity Module (SIM) card; and
a processor, which searches for a Public Land Mobile Network (PLMN) based on priority information registered in the SIM card;
wherein, regarding the PLMN that has been found, the processor:
- determines whether the SIM card includes any priority information about at least one particular radio access technology associated with the PLMN;
- when priority information is included in the SIM card, selects a cell of the PLMN;
- when priority information is not included in the SIM card, determines whether the nonvolatile memory includes any information about at least one particular radio access technology to be selected on a priority basis in a country of the PLMN;
- when priority information is included in the nonvolatile memory, selects a cell of the PLMN for which the particular radio access technology has been developed; and
- when priority information is not included in the nonvolatile memory, selects a cell, where a radio access technology, which has been set by default in the nonvolatile memory for all countries that are not listed in the nonvolatile memory.

9. The mobile communication terminal according to claim 8, wherein
association made between at least one code indicating a country where the mobile communications terminal may be used, and at least one radio access technology to be searched for on a priority basis in this country is registered in the nonvolatile memory.

10. The mobile communication terminal according to claim 9, wherein when there is no association made between a radio access technology and a code indicating a country where the mobile communications terminal is used, the nonvolatile memory has information about a radio access technology that is searched for by default.

11. The mobile communication terminal according to claim 9, wherein when the nonvolatile memory is designed, the association is registered in the nonvolatile memory by a communications company.

12. The mobile communication terminal according to claim 9, wherein the association is remotely downloaded in the nonvolatile memory.

13. The mobile communication terminal according to claim 9, wherein the association can be reconfigured by a user of the mobile communication terminal.

14. The mobile communication terminal according to claim 8, wherein the mobile communication terminal is a Global System for Mobile Communications (GSM)/Universal Mobile Telecommunication Systems (UMTS) multimode mobile phone.

* * * * *